(12) United States Patent
Sapuan Sahori et al.

(10) Patent No.: US 9,077,408 B1
(45) Date of Patent: Jul. 7, 2015

(54) CIRCUITRY AND TECHNIQUES FOR CALCULATING SCALING FACTORS FOR CREST FACTOR REDUCTION

(71) Applicants: Sharifuddin Sapuan Sahori, Ampang Jaya (MA); Benjamin Thomas Cope, London (GB); Lei Xu, High Wycombe (GB)

(72) Inventors: Sharifuddin Sapuan Sahori, Ampang Jaya (MA); Benjamin Thomas Cope, London (GB); Lei Xu, High Wycombe (GB)

(73) Assignee: Altera Corporation, San Jose, CA (US)

( * ) Notice: Subject to any disclaimer, the term of this patent is extended or adjusted under 35 U.S.C. 154(b) by 240 days.

(21) Appl. No.: 13/633,063

(22) Filed: Oct. 1, 2012

(51) Int. Cl.
*H04L 27/28* (2006.01)
*H04L 25/49* (2006.01)
*H04B 1/04* (2006.01)

(52) U.S. Cl.
CPC ................................. *H04B 1/0475* (2013.01)

(58) Field of Classification Search
CPC ............ H04L 27/2624; H04L 27/2623; H04L 27/2614; H04B 1/0475
USPC ............... 375/260, 296, 297, 219; 455/114.2, 455/114.3; 708/650
See application file for complete search history.

(56) References Cited

U.S. PATENT DOCUMENTS

| | | | | |
|---|---|---|---|---|
| 7,983,327 | B2* | 7/2011 | Brobston | 375/297 |
| 8,503,950 | B1* | 8/2013 | Dick | 455/114.3 |
| 2004/0042559 | A1* | 3/2004 | Jaenecke et al. | 375/297 |
| 2004/0203430 | A1* | 10/2004 | Morris | 455/67.11 |
| 2010/0246714 | A1* | 9/2010 | Yang et al. | 375/296 |

* cited by examiner

*Primary Examiner* — Betsy Deppe (57) ABSTRACT

A method includes identifying a signal peak from an input signal. The signal peak may be detected with peak detection circuitry. A serial division operation may be performed on the identified signal peak value with serial division circuitry to obtain a scaling factor. The peak detection circuitry may identify an additional signal peak from the input signal concurrently with the serial division operation. The serial division operation may be halted if the additional identified signal peak is greater than the previous identified signal peak. Another serial division operation may be performed based on the additional identified signal peak.

20 Claims, 10 Drawing Sheets

CIRCUITRY AND TECHNIQUES FOR CALCULATING SCALING FACTORS FOR CREST FACTOR REDUCTION

BACKGROUND

In various signal transmission schemes, signals are amplified (e.g., by a power amplifier) before transmission. As such, power amplifiers are generally included in a typical communication system. As an example, in a base station of a wireless communication system, a power amplifier may be used to amplify signals before they are transmitted to different clients.

Generally, power amplifiers may be designed to operate optimally within a certain peak-to-average ratio (PAR). However, signals in many communication systems, such as the wideband code division multiple access (WCDMA) and the orthogonal frequency-division multiplexing (OFDM) systems, may often have a PAR that may adversely affect the performance of power amplifiers. Accordingly, in order to increase the efficiency of a power amplifier, the dynamic range of input signals (e.g., the ratio between the largest and smallest magnitudes of the input signals) may need to be reduced before being transmitted to the power amplifier.

Crest factor reduction (CFR) is a technique that may be used to limit the dynamic range of signals in such systems. As an example, in a remote radio head (RRH) system (a typical subsystem in a communication base system), a CFR module may be used to scale input signals before they are transmitted to the power amplifier module. One of the more common techniques that may be employed by a CFR module is peak cancellation.

In a peak cancellation crest factor reduction system, scaled cancellation pulses are subtracted from the original input signals. In order to generate the cancellation pulses, scaling factors need to be calculated for peaks in the input signals. However, existing techniques for obtaining scaling factors may be resource intensive. As such, it may be challenging to implement an efficient CFR module on an integrated circuit device with limited hardware resources. For example, conventional implementations of CFR modules may include resource-intensive circuitry such as divider circuits.

SUMMARY

Circuitry and techniques for obtaining scaling factors are provided. Embodiments of the present invention include methods and circuitry for generating scaling factors with fewer resources (e.g., with a reduced number of divider circuits).

It is appreciated that the present invention can be implemented in numerous ways, such as a process, an apparatus, a system, a device, or a computer-readable medium. Several inventive embodiments of the present invention are described below.

A method may include identifying a signal peak from an input with peak detection circuitry. A serial division operation may be performed on the value of the identified signal peak to obtain a scaling factor. Another signal peak may be identified with the peak detection circuitry in parallel with the serial division operation. The newly identified signal peak may then be compared with the previous signal peak, and if the value of the previous signal peak is lower, the serial division operation may be reinitialized to obtain a scaling factor based on the newly identified signal peak.

A method of operating an integrated circuit includes detecting, from a signal, a first signal peak having a first signal peak value with peak detection circuitry. A division circuit may perform a division operation on the first peak to obtain a scaling factor based on the first signal peak value. The peak detection circuitry may detect a second signal peak having a second signal peak value from the signal. The division circuit may determine whether the second signal peak value is greater than the first signal peak value, and may halt the ongoing division operation based on the second signal peak value (e.g., in response to determining that the second signal peak value is greater than the first signal peak value).

An integrated circuit includes a peak detection circuit and a serial division circuit. The peak detection circuit is operable to receive an input data stream and may identify a signal peak in the input data stream. The serial division circuit is operable to perform a serial division operation on a peak value of the identified signal peak to obtain a scaling factor based on the identified signal peak.

DETAILED DESCRIPTION

The embodiments provided herein include circuitry and techniques to calculate scaling factors with a reduced number of divider circuits.

It will be obvious, however, to one skilled in the art, that the present exemplary embodiments may be practiced without some or all of these specific details. In other instances, well-known operations have not been described in detail in order not to unnecessarily obscure the present embodiments.

Crest factor reduction (CFR) is a commonly used technique for scaling input signals in wireless communication systems. This may be partly due to the fact that power amplifier modules that are normally included in such systems are generally designed to operate optimally within a specific dynamic range. As such, in order to potentially increase the efficiency of the overall system, input signals with a wide dynamic range may need to be scaled before they are transmitted to the power amplifier module (e.g., to accommodate the limited dynamic range of the power amplifier module and thereby improve amplifier efficiency). The scaling operation may include a resource intensive division operation and as such, improved techniques and circuitry for calculating scaling factors more efficiently are needed.

One of the embodiments described herein provides a technique for performing a serial division operation to obtain a scaling factor. The serial division operation may be performed using fewer resources (e.g., with a reduced number of divider circuits) compared to a parallel division operation. In one of the embodiments, a serial division module in a CFR circuit may be coupled to receive a signal peak from a peak detection module, and may perform a serial division operation on the received signal peak as the peak detection module continues to detect other signal peaks. The serial division module may include a divider circuit that may be configured to receive an input (e.g., a signal peak value) and divide that input serially to obtain a scaling factor after a few clock cycles.

Figure 1A:
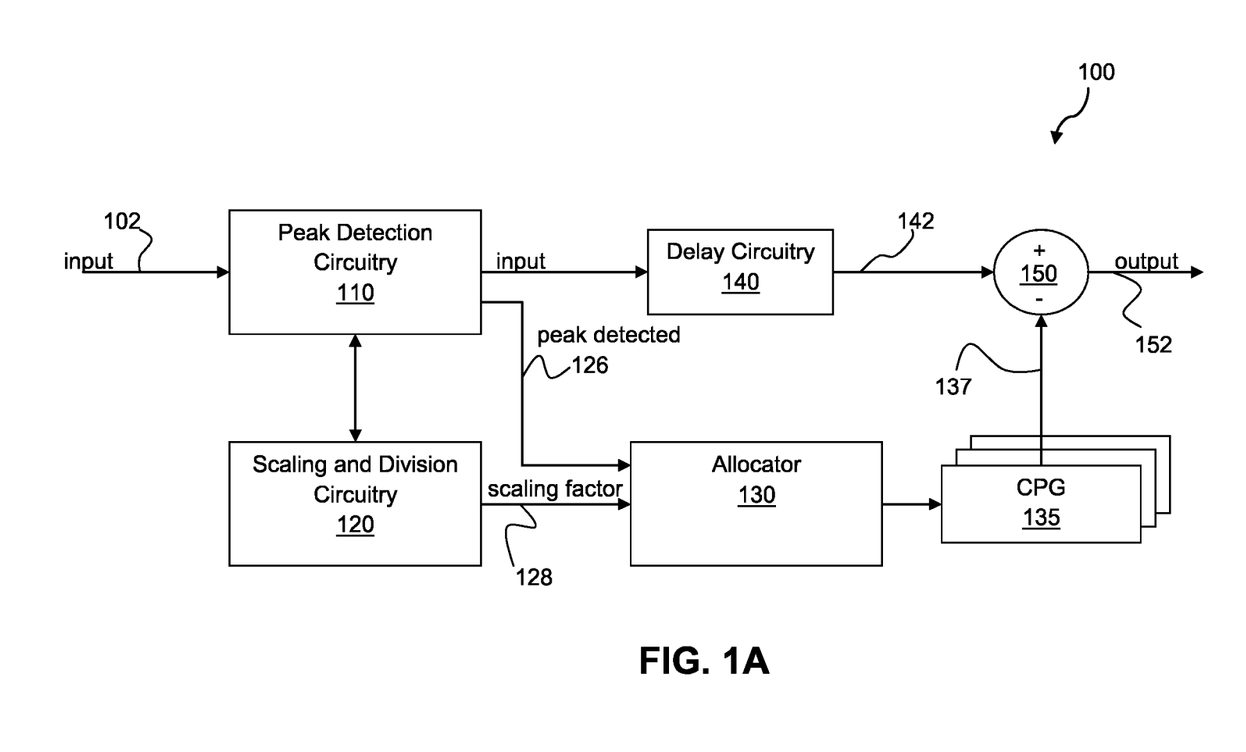
FIG. 1A shows a simplified block diagram of an illustrative crest factor reduction (CFR) circuit in accordance with one embodiment of the present invention.

FIG. 1A shows a simplified block diagram of an illustrative CFR circuit 100 in accordance with one embodiment of the present invention. CFR circuit 100 may include peak detection circuitry 110, scaling and division circuitry 120, allocator 130, delay circuitry 140, cancellation pulse generators 135, and subtractor/adder circuit 150. In the embodiment of FIG. 1A, peak detection circuitry 110 is coupled to receive input signal 102 (e.g., an input data stream). Peak detection circuitry 110 may calculate and determine if input signal 102 exceeds a predetermined peak magnitude threshold. As an example, if input signal 102 is an input data stream, peak detection circuitry 110 may identify signal peaks within the input data stream that exceed the predetermined peak magnitude threshold. It should be appreciated that the peak magnitude threshold may be pre-determined based on the type of input signals received by peak detection circuitry 110 (e.g., input 102). In one embodiment, the peak magnitude threshold value may be provided by a user input or a user application.

As the signal peaks in the data stream (e.g., input signal 102) are identified, scaling factors for the identified signal peaks may be generated by scaling and division circuitry 120. In the embodiment of FIG. 1A, scaling and division circuitry 120 is coupled to peak detection circuitry 110. As such, scaling factors may be calculated as different peaks are identified by peak detection circuitry 110. As an example, peak detection circuitry 110 may identify a first signal peak (e.g., a first magnitude value in input signal 102 that exceeds the predetermined threshold value) and scaling and division circuitry 120 may accordingly begin calculating a scaling factor based on the first identified peak value.

While scaling and division circuitry 120 is calculating the scaling factor, peak detection circuitry 110 may continue to detect other signal peaks in the data stream (e.g., input signal 102). In one embodiment, when peak detection circuitry 110 detects a second signal peak, scaling and division circuitry may begin calculating a scaling factor based on the second identified signal peak value if the second identified signal peak value is greater than the first signal peak value. As such, if the first signal peak value is smaller than the second signal peak value, scaling and division circuitry 120 may abandon its current operation (e.g., the first calculation to generate a scaling factor based on the first identified signal peak value) in order to begin generating a scaling factor based on the higher signal peak value (e.g., the second signal peak value).

Allocator 130 may receive peak detected signal 126 from peak detection circuitry 110 and its associated scaling factor 128 from scaling and division circuitry 120. The scaling factor 128 may be transmitted or "allocated" to a cancellation pulse generator circuit 135. Multiple cancellation pulse generators 135 may be included in a CFR circuit such as CFR circuit 100. In one embodiment, cancellation pulse generators 135 may include pulse memory modules. The pulse memory modules may store different pulses (e.g., sinc pulses). Cancellation pulses may thus be created by using the calculated scaling factors together with the sinc pulses to generate scaled sinc pulses based on the different scaling factors. The scaled sinc pulses may also be known as cancellation pulses. These cancellation pulses may then be summed together to generate a composite cancellation pulse 137.

The composite cancellation pulse 137 may then be subtracted from a delayed version 142 of input signal 102. It should be appreciated that input signal 102 may be delayed by delay circuitry 140, which may be formed by a plurality of delay cells, such that the delayed version 142 of the input signal 102 is appropriately aligned with the generated composite cancellation pulse 137. Subtractor/adder circuit 150 may then subtract composite cancellation pulse 137 from the delayed version 142 of input signal 102 to produce an output signal (e.g., output signal 152) with a reduced peak-to-average ratio (PAR).

Figure 1B:
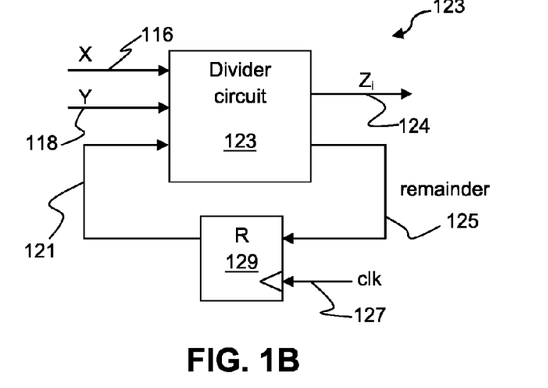
FIG. 1B shows an illustrative divider circuit in accordance with one embodiment of the present invention.

FIG. 1B shows an illustrative divider circuit 123 in accordance with one embodiment of the present invention. Divider circuit 123 may receive a dividend, X, at input terminal 116 and a divisor, Y, at input terminal 118. Divider circuit 123 may perform a division operation (e.g., X/Y) and generate an output bit, Zi, at output terminal 124 and remainder 125 at every clock cycle. It should be appreciated that a register 129 (e.g., a flip flop) may be used to clock the remainder 125 from divider circuit 123 so that clocked remainder 121 can be fed back to divider circuit 123 at each clock cycle.

In the embodiment of FIG. 1B, register 129 may be clocked by a clock signal, clk, at its clock input 127. It should be appreciated that clock signal clk may be a common clock signal used in the circuit (e.g., CFR circuit 100 of FIG. 1A). As the input (e.g., dividend 116) is divided bit-by-bit, the number of clock cycles required to generate a full output, Z, may depend on the total number of bits of dividend input 116. For example, if dividend 116 is an 8-bit input, divider circuit 123 may require a total of eight clock cycles to produce a full output (e.g., one clock cycle for every output bit, Zi). In one embodiment, divider circuit 123 and register 129 may be included in scaling and division circuitry 120 of FIG. 1A and as such, may be used to generate scaling factors for a CFR circuit (e.g., CFR circuit 100).

Figure 1C:
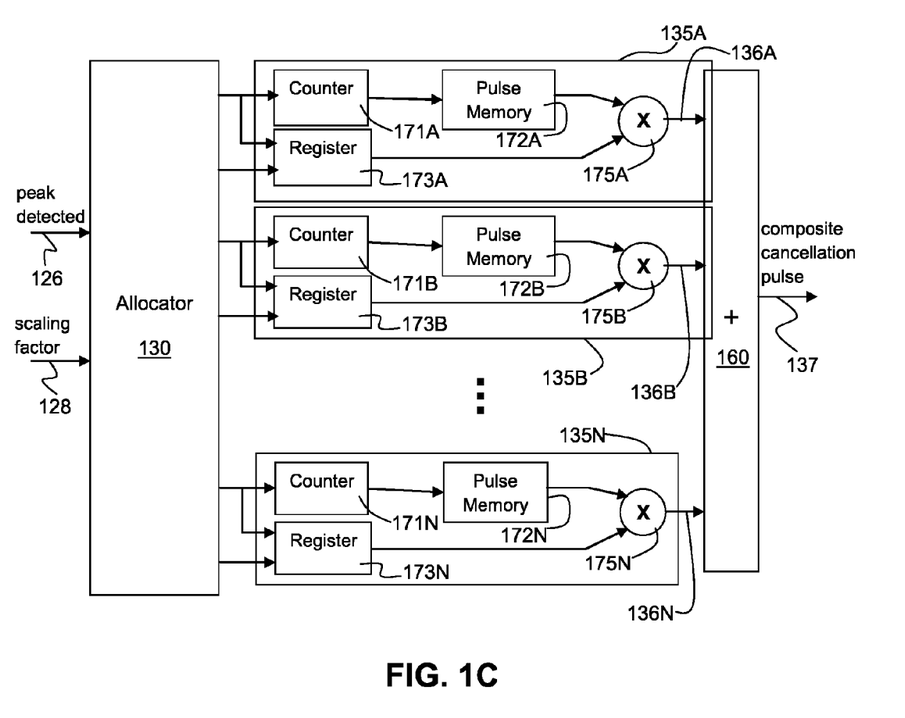
FIG. 1C shows illustrative cancellation pulse generator circuits coupled to an allocator circuit and an adder circuit in accordance with one embodiment of the present invention.

FIG. 1C shows illustrative cancellation pulse generator circuits 135A-135N coupled to an allocator circuit 130 and an adder circuit 160 in accordance with one embodiment of the present invention. Allocator 130 may be coupled to receive a peak detected signal 126 and its corresponding scaling factor 128. It should be appreciated that allocator 130 may include circuits and logic elements (the details of which are not shown here in order to not obscure the present invention) that may be used to transmit the received signals (e.g., peak detected signal 126 and scaling factor 128) to an appropriate cancellation pulse generator circuit (e.g., one of cancellation pulse generator circuits 135A-135N).

In the embodiment of FIG. 1C, each of the cancellation pulse generators 135A-135N may include a counter (counters 171A-171N), a register (registers 173A-173N), a pulse memory module (pulse memory modules 172A-172N), and a multiplier circuit (multiplier circuits 175A-175N). As an example, when the peak detection circuitry (e.g., peak detection circuitry 110 of FIG. 1A) detects a signal peak within a specific peak detection window (the details of which are described in reference to FIGS. 2A-2C), its corresponding scaling factor 128 may be transmitted to allocator 130.

Allocator 130 may then transmit the peak detected signal and the scaling factor (e.g., peak detected signal 126 and scaling factor 128) to one of the cancellation pulse generators 135A-135N. For instance, if all the cancellation pulse generators 135A-135N are available (e.g., not in use), allocator 130 may transmit peak detected signal 126 and scaling factor 128 to the one of the cancellation pulse generators 135A-135N (e.g., the first cancellation pulse generators 135A). Cancellation pulse generator 135A may store scaling factor 128 in register 173A when it receives peak detected signal 126. In one embodiment, cancellation pulse generators 135A-135N may be activated when peak detected signal 126 is at a logic high level (e.g., logic level 1).

In one embodiment, counter 171A (or any of counters 171A-171N) may begin counting or iterating through a number of samples. As an example, if a sinc pulse used has a total of 120 samples, counter 171A may count from 0-119 (for a total of 120 samples). Accordingly, pulse memory module 172 may store sinc pulses that may then be multiplied with scaling factor 128. In the embodiment of FIG. 1C, multiplier circuit 175A in cancellation pulse generator 135A may multiple the sinc pulses stored in pulse memory module 172A with the associated scaling factor 128 to generate scaled sinc pulses 136A.

It should be appreciated that as the peak detection circuitry (e.g., peak detection circuitry 110 of FIG. 1A) examines the received input signal, another peak may be detected in another peak detection window of the input signal (the details of which are explained in reference to FIGS. 2A-2C) and as such, another scaling factor may be calculated. Accordingly, allocator 130 may transmit peak detected signal 126 and the new scaling factor to another cancellation pulse generator (e.g., 135B-135N) and the process as described above may be repeated for the next peak detection window (and subsequent peak detection windows) with its associated scaling factor. Therefore, as all the scaled sinc pulses (e.g., scaled sinc pulses 136A-136N) are generated for all the peak detection windows, adder circuit 160 may combine all the scaled sinc pulses 136A-136N to generate a composite cancellation pulse 137. In one embodiment, the composite cancellation pulse 137 may be subtracted from an input data stream (e.g., input signal 102 of FIG. 1A) to generate a scaled output.

Figure 2A:
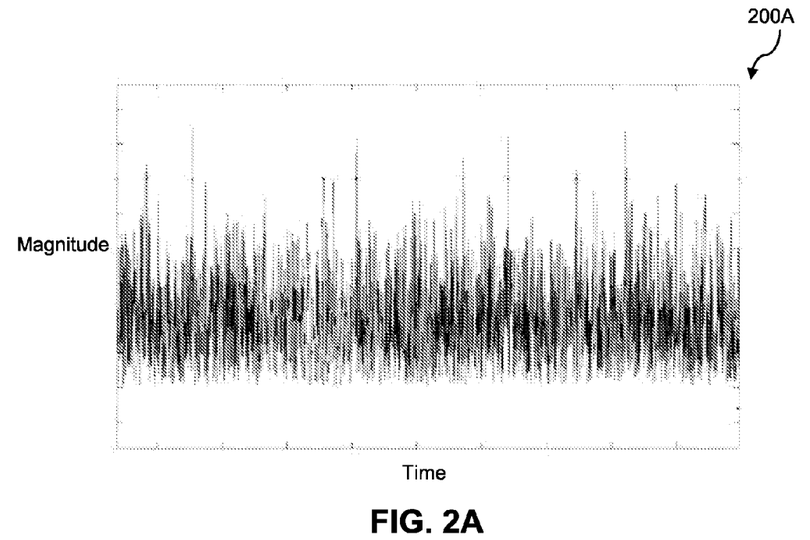
FIG. 2A shows an illustrative input waveform in accordance with one embodiment of the present invention.

FIG. 2A shows an illustrative input waveform 200A in accordance with one embodiment of the present invention. Input waveform 200A may represent a data stream in a wireless communication system. In one embodiment, input waveform 200A may represent input signal 102 received by CFR circuit 100 of FIG. 1A. As illustrated by input waveform 200A, the received data stream may experience different peak values or magnitudes over time. Unprocessed signals (e.g., input waveform 200A) may have a relatively higher PAR due to the relatively high signal peaks.

Figure 2B:
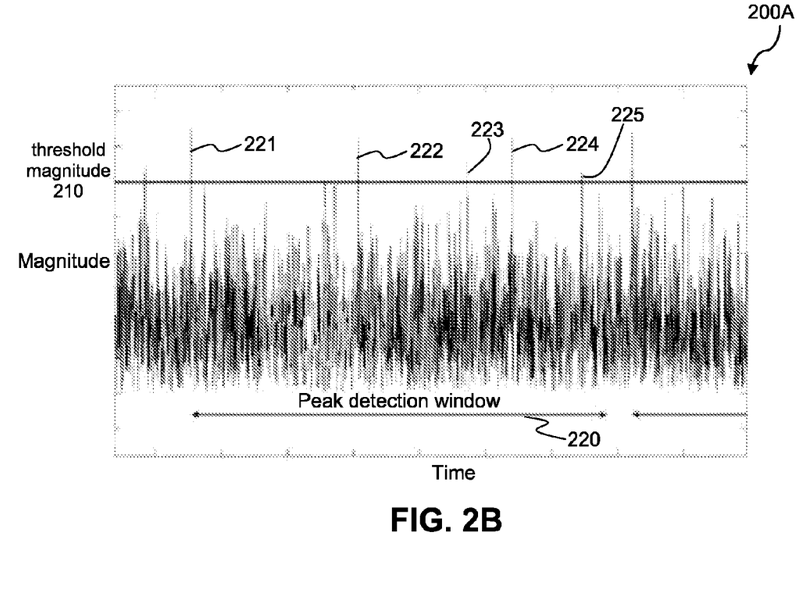
FIG. 2B shows the illustrative input waveform with identified signal peaks within a peak detection window in accordance with one embodiment of the present invention.

FIG. 2B shows illustrative input waveform 200A with signal peaks 221-225 identified within a peak detection window 220 in accordance with one embodiment of the present invention. In one embodiment, signal peaks 221-225 may be identified or detected by a peak detection block (e.g., peak detection circuitry 110 of FIG. 1A). It should be appreciated that signal peaks may be defined as signal magnitudes that are greater than a predetermined threshold value (e.g., threshold magnitude 210). In one embodiment, the threshold value may be determined by the type of signals being processed by the system. A peak detection window 220, as shown in FIG. 2B, may be described as the interval of time when signal peaks may be detected by the peak detection block or circuitry to obtain a scaling factor for that particular interval. In the embodiment of FIG. 2B, five different peaks 221-225 may be identified or detected during peak detection window 220.

In one embodiment, as a peak detection block (e.g., peak detection circuitry 110 of FIG. 1A) detects a first signal peak magnitude (e.g., signal peak 221), the magnitude of that particular signal peak may be transmitted to a scaling block (e.g., scaling and division circuitry 120 of FIG. 1A). The scaling block may then begin to calculate a scaling factor based on the first signal peak magnitude. As an example, the scaling factor may be obtained from the following formula:

$$\frac{\text{signal peak magnitude} - \text{threshold magnitude}}{\text{signal peak magnitude}}$$

Accordingly, the scaling block may begin to perform a division operation when it receives the signal peak magnitude from the peak detection block. In one embodiment, the division operation may be a serial division operation where the difference between the signal peak magnitude and the threshold magnitude is divided by the signal peak magnitude bit by bit (e.g., a selected bit is divided at every clock cycle).

When the peak detection block detects a second signal peak (e.g., signal peak 222) within the same peak detection window (e.g., peak detection window 220), the scaling block may compare the magnitude of signal peak 222 with the magnitude of signal peak 221. If the magnitude of signal peak 222 is greater than the magnitude of signal peak 221, the scaling block may stop the division operation that is being performed based on the first signal peak magnitude, and may restart the division operation in order to obtain a scaling factor based on the second signal peak magnitude (e.g., signal peak 222). If, however, the magnitude of the second detected signal peak, is lower than the magnitude of the first detected signal peak (e.g., in the embodiment of FIG. 2B, signal peak 222 is lower than signal peak 221), the scaling block may continue to perform the division operation based on the first signal peak magnitude.

In one embodiment, the peak detection block may continuously detect other signal peaks (e.g., signal peaks 223-225) within the peak detection window (e.g., peak detection window 220) as the scaling factor is being calculated by the scaling block. It should be appreciated that there may be multiple peak detection windows even though only a single peak detection window 220 is shown in the embodiment of FIG. 2B. It should also be appreciated that the width of the peak detection window may be adjusted based on the number of clock cycles needed to perform a complete serial division operation on the magnitude of the detected signal peak. As an example, if a total of 24 clock cycles is needed to perform a complete serial division operation to obtain the scaling factor, the width of the peak detection window may need to be at least 24 clock cycles (or more) wide.

Accordingly, a scaling factor may be calculated for every peak detection window (e.g., peak detection window 220) by the scaling block and a cancellation pulse based on the corresponding scaling factor may be generated for every peak detection window. In the embodiment of FIG. 1C, the cancellation pulses (generated by cancellation pulse generators 135A-135N) may be combined by adder circuit 160 to generate a composite cancellation pulse 137. The composite cancellation pulse may be used to clip or scale signal peaks detected (e.g., signal peaks 221-225) in the input data stream (e.g., as represented by input waveform 200A).

Figure 2C:
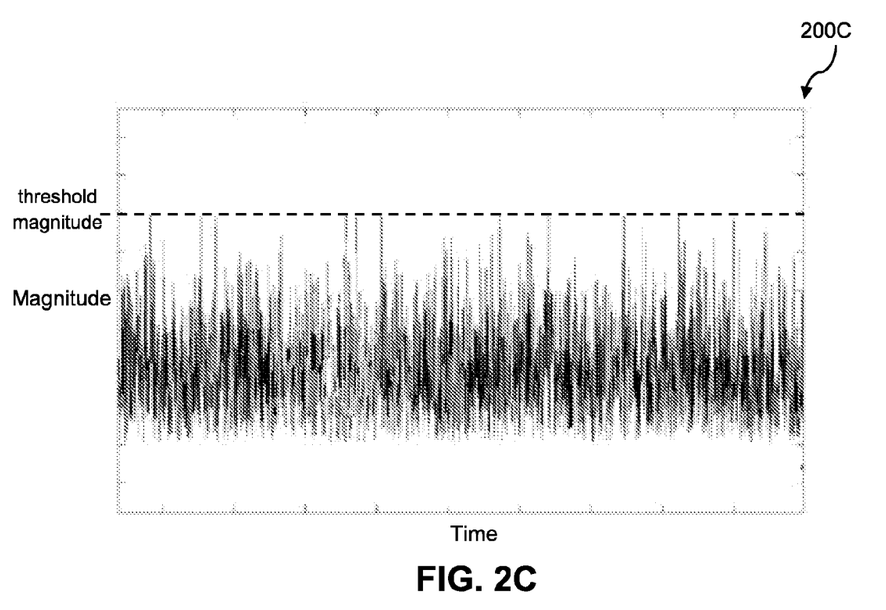
FIG. 2C shows a processed output waveform with a reduced PAR in accordance with an embodiment of the present invention.

FIG. 2C shows a processed output waveform 200C with a reduced PAR in accordance with an embodiment of the present invention. It should be appreciated that output waveform 200C may represent a clipped version of input waveform 200A of FIGS. 2A and 2B. As an example, input waveform 200A may be clipped at the predetermined threshold magnitude. In one embodiment, a cancellation pulse may be generated based on the various signal peaks detected in an input data stream, and the input data stream may be clipped by subtracting the cancellation pulse from the input data stream. It should be appreciated that compared to input waveform 200A of FIG. 2A, the output waveform 200C may have a reduced PAR.

Figure 3:
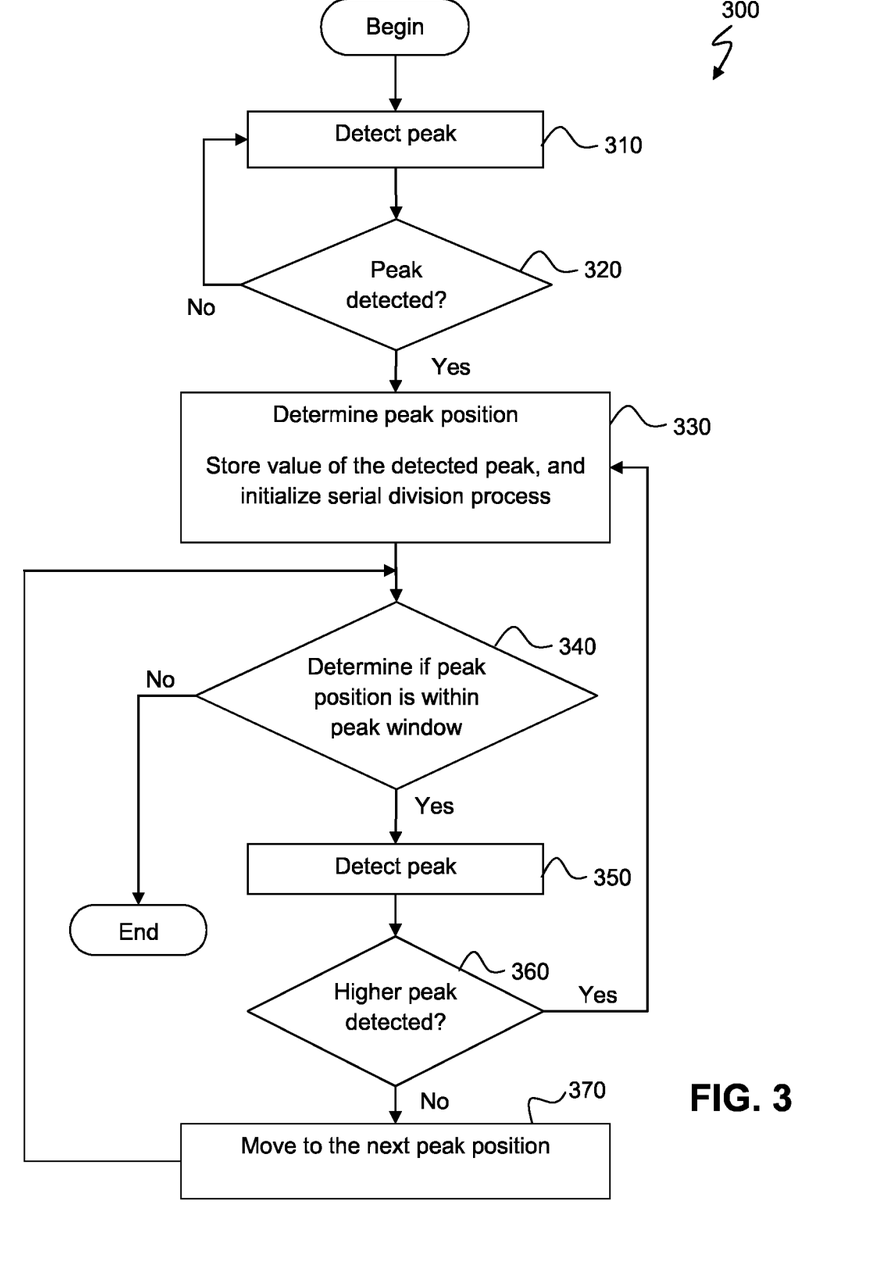
FIG. 3 shows a method for performing a CFR operation in accordance with an embodiment of the present invention.

FIG. 3 shows method 300 for performing a CFR operation in accordance with an embodiment of the present invention. At step 310, a peak detect operation may be performed to detect a signal peak in an input data stream. In one embodiment the peak detect operation (e.g., a search operation) may be performed by a peak detection block (e.g., peak detection circuitry 110 of FIG. 1A). The peak detect operation may continue until a signal peak is detected. At step 320, when a signal peak is detected, the position of the signal peak is determined (e.g., a peak distance counter, which may be included in the peak detection block, may be reset) and the detected peak value (e.g., the magnitude of the peak) is stored at step 330. A serial division process may also be initialized at step 330. As described earlier, a scaling factor may be obtained through the serial division process based on the detected signal peak value.

At step 340, if the position of the detected signal peak is within a particular peak detection window (e.g., peak detection window 220 of FIG. 2B), the peak detection block may continue to search for and detect other peaks within the same peak detection window at step 350. Otherwise, the peak detection operation may be terminated. At step 360, if the detected signal peak lies within the peak detection window, and its signal peak value is not higher than the value of a previously detected signal peak (if any), the peak detection block may move the search or peak detect operation to the next peak position at step 370. As an example, the peak distance counter in the peak detection block may be incremented.

It should be appreciated that the serial division process, initialized at step 330, may continue through steps 340-370 until another signal peak, which may be higher than the previously detected signal peak, is detected. The peak detection block may accordingly continue to search for and detect other signal peaks at step 340 if the current peak position is still within the peak detection window (as determined in step 340).

If a higher signal peak is detected at step 360, the operation may continue from step 330 and as such, the newly detected signal peak distance is determined (e.g., the peak distance counter in the peak detection block may be set to the position of the newly detected signal peak), and the new signal peak value is stored. Accordingly, the serial division process at step 330 may be reinitialized. As an example, the previous serial division process based on the previously detected signal peak may be halted or terminated so that a new serial division process may be carried out by the scaling block based on the newly detected signal peak value. Subsequent steps (e.g., steps 340-370) may be repeated until the end of the particular peak detection window (e.g., when the position of a current detected signal peak does not lie within the peak detection window), as determined at step 340. In one embodiment, a scaling factor associated with the particular peak detection window may be stored at the end of the peak detection window, and method 300 may be repeated for multiple peak detection windows in the data stream. It should be appreciated that even though a serial division process is described at step 330 other iterative functions may be performed in this context. As an example, a serial reciprocal square root process may be initialized at step 330. Accordingly, the reciprocal square root may be calculated serially through steps 340-370 while subsequent peaks are being identified.

Figure 4:
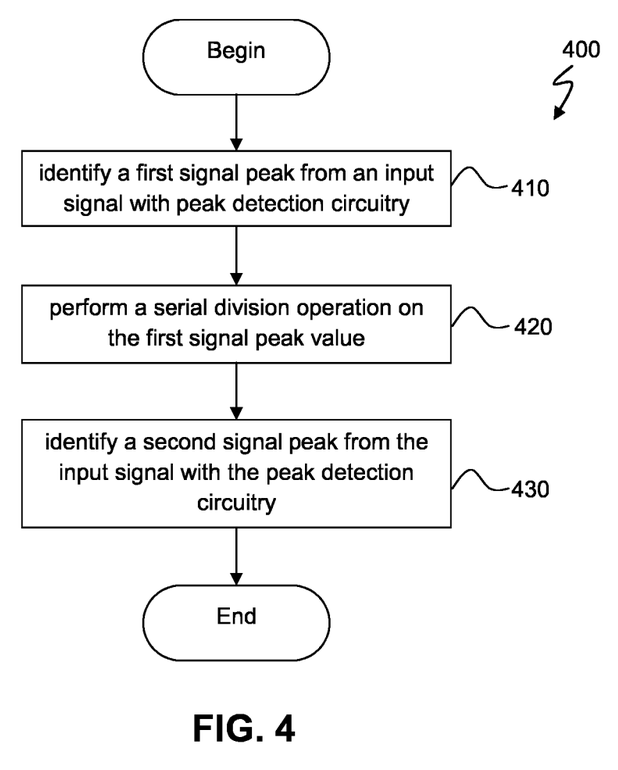
FIG. 4 shows a method for operating an integrated circuit as one embodiment of the present invention.

FIG. 4 shows method 400 for operating an integrated circuit as one embodiment of the present invention. At step 400, a first signal peak is identified, with peak detection circuitry, from an input signal. The input signal may include an input data stream that is received by an input-output circuitry (e.g., transceiver circuitry) on the integrated circuit. The input data stream may be transmitted from the input-output circuitry to the peak detection circuitry within the integrated circuit.

At step 420, a serial division operation may be performed on the first signal peak value. As an example, the integrated circuit may include a division circuit similar to scaling and division circuitry 120 of FIG. 1A that may be used to perform the serial division operation at step 420. A second signal peak may be identified from the input signal at step 430 with the peak detection circuitry. The peak detection circuitry may identify the second signal peak (and other subsequent signal peaks) in parallel with the serial division operation at step 420. In other words, the serial division operation at step 420 may continue through step 430 (e.g., steps 420 and 430 may be performed concurrently) as the second signal peak is identified with the peak detection circuitry. In one embodiment, if the second signal peak is higher than the first signal peak, the serial division operation at step 420 may be halted (or the serial division operation may be replaced with another serial division operation performed based on the second signal peak value).

Figure 5:
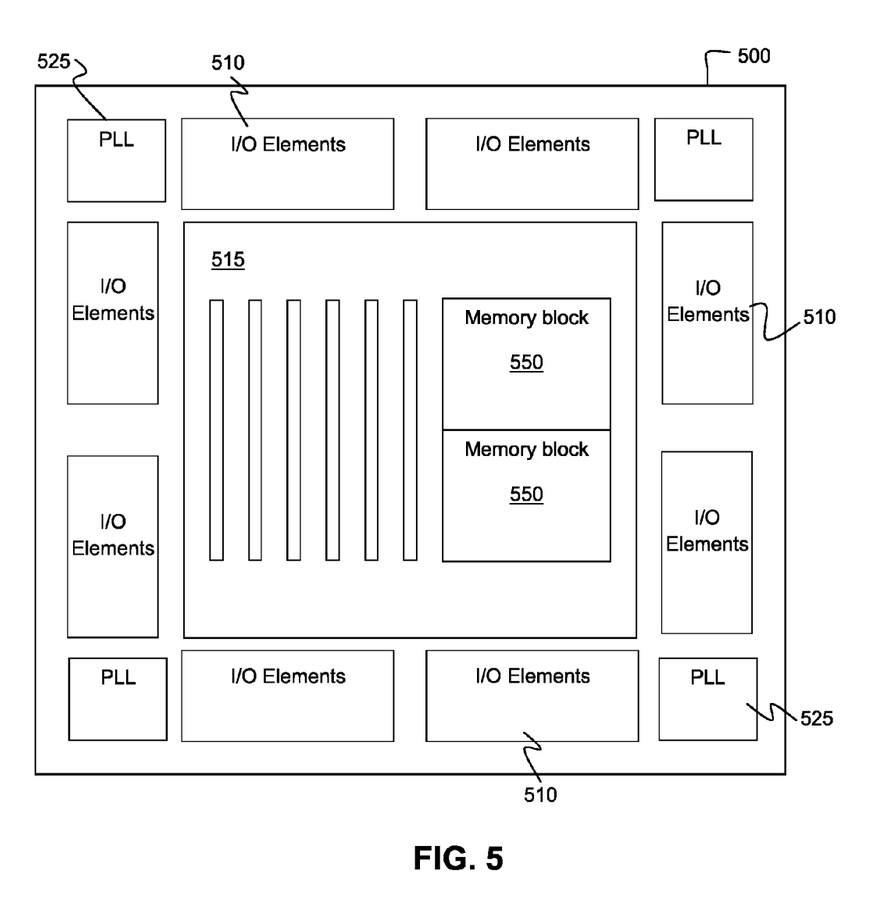
FIG. 5 shows a simplified block diagram of an integrated circuit that can implement embodiments of the present invention.

FIG. 5, meant to be illustrative and not limiting, shows a simplified block diagram of integrated circuit 500 that can implement embodiments of the present invention. Integrated circuit 500 includes core logic region 515 and input-output elements 510. Other auxiliary circuits, such as phase-locked loops (PLLs) 525 for clock generation and timing, can be located outside the core logic region 515 (e.g., at corners of integrated circuit 500 and adjacent to input-output elements 510).

Core logic region 515 may be populated with logic cells that may include "logic elements" (LEs), among other circuits. LEs may include look-up table-based logic regions and may be grouped into "Logic Array Blocks" (LABs). The LEs and groups of LEs or LABs can be configured to perform logical functions desired by the user. Configuration data loaded into configuration memory can be used to produce control signals that configure the LEs and groups of LEs and LABs to perform the desired logical functions. In one embodiment, an integrated circuit device (e.g., integrated circuit 500) may be configured to include a CFR circuit similar to CFR circuit 100 of FIG. 1A.

In the embodiment of FIG. 5, input-output elements 510 may include input-output buffers that connect integrated circuit 500 to other external components. Accordingly, integrated circuit 500 may receive signals from external circuitry at input-output elements 510 and the signals may be routed from input-output elements 510 to core logic region 515 and other logic blocks on integrated circuit 500. Core logic region 515 and other logic blocks on integrated circuit 500 may perform functions based on the signals received. Signals from core region 515 may be transmitted through input-output elements 510 to external components that may be connected to integrated circuit 500. A single device like integrated circuit 500 can potentially support a variety of different interfaces and each individual input-output bank 510 can support a different input-output standard with a different interface.

Figure 6:
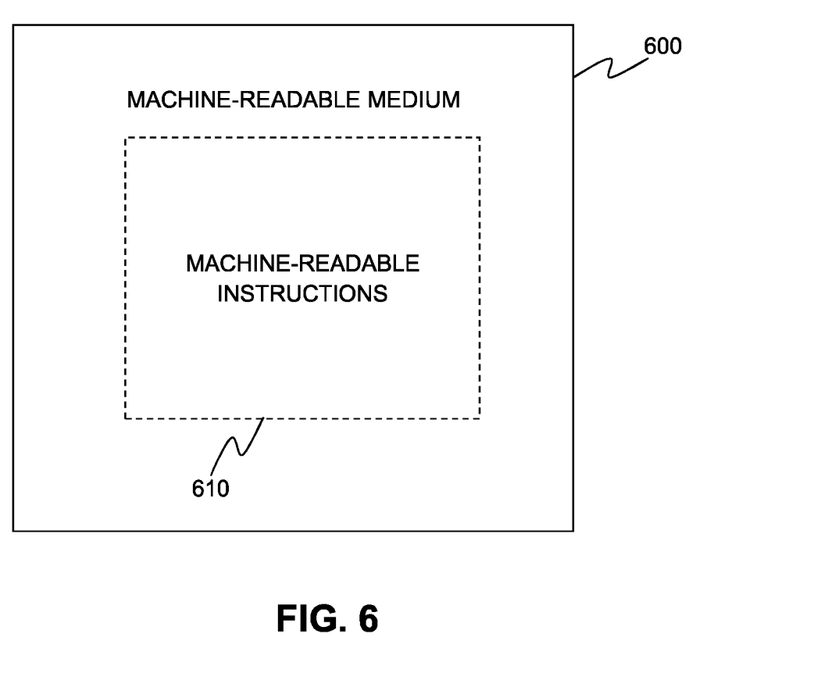
FIG. 6 shows an illustrative machine-readable storage medium that with machine-readable instructions that can implement embodiments of the present invention.

The methods or techniques described above can also be embodied as machine-readable instructions 610 on machine-readable storage medium 600 as shown in FIG. 6. It should be appreciated that machine-readable storage medium 600 may be any data storage device that can store data, which can thereafter be read by a machine or a computer system. Illustrative examples of machine-readable storage medium 600 include, among others, hard drives, network attached storage (NAS), read-only memory, random-access memory, CDs, DVDs, USB drives, volatile and non-volatile memory, and other optical and non-optical data storage devices. Machine-readable storage medium 600 may also be distributed over a network-coupled computer system so that machine-readable instructions 610 are stored and executed in a distributed fashion. In one embodiment, machine-readable instructions 610 may perform any or all of the steps illustrated in FIGS. 3 and 4.

Figure 7:
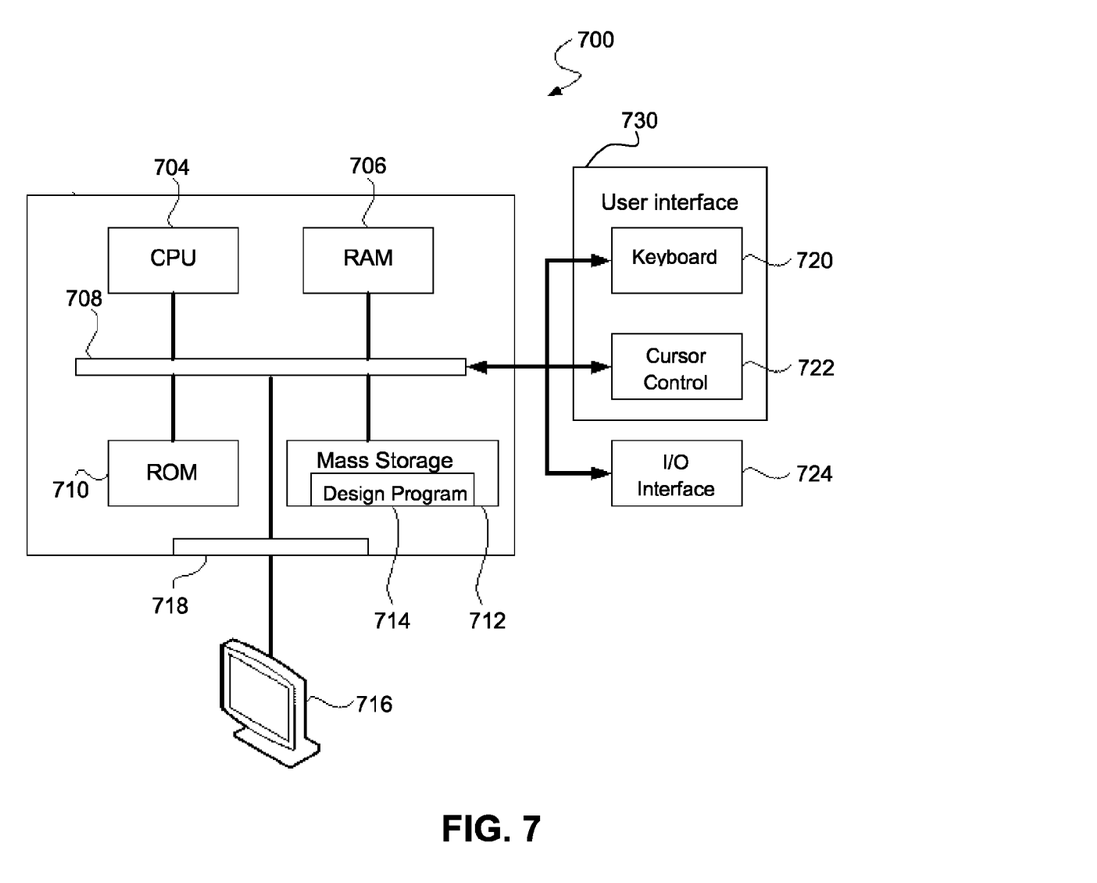
FIG. 7 is a simplified schematic diagram of a computer system for implementing embodiments of the present invention.

FIG. 7 is a simplified schematic diagram of a computer system 700 for implementing embodiments of the present invention. It should be appreciated that the methods described herein may be performed with a digital processing system, such as a conventional, general-purpose computer system. Special-purpose computers, which are designed or programmed to perform one function may be used in the alternative. In addition, the computer system of FIG. 7 may be used for configuring an integrated circuit device (e.g., integrated circuit 500 of FIG. 5).

Computer system 700 may include a central processing unit (CPU) 704, which is coupled through bus 708 to random access memory (RAM) 706, read-only memory (ROM) 710, and mass storage 712. Mass storage device 712 represents a persistent data storage device such as a flash drive or a disc drive, which may be local or remote. Design program 714 may be an electronic design automation (EDA) tool that may be operable to compile a user design and load the design to an integrated circuit device (not shown) that may be coupled to computer system 700 through I/O interface 724. Design program 714 resides in mass storage 712, but can also reside in RAM 706 during processing. In one embodiment, design program 714 may be used to implement circuitry for performing a CFR operation (e.g., CFR circuit 100 of FIG. 1A).

It should be appreciated that CPU 704 may be embodied in a general-purpose processor, a special-purpose processor, or a specially programmed logic device. Display 716 is in communication with CPU 704, RAM 706, ROM 710, and mass storage device 712, through bus 708 and display interface 718. Display 716 may be configured to display either a graphical (or text-based) user interface or other visual indicators. User interface elements 730 may include, among others, keyboard 720, cursor control 722, and may be coupled to bus 708 to communicate information or user input to CPU 704. Other interfaces, such as input-output interface 724, may also be coupled to bus 708. It should be appreciated that data to and from external devices may be communicated through input-output interface 724.

Figure 8:
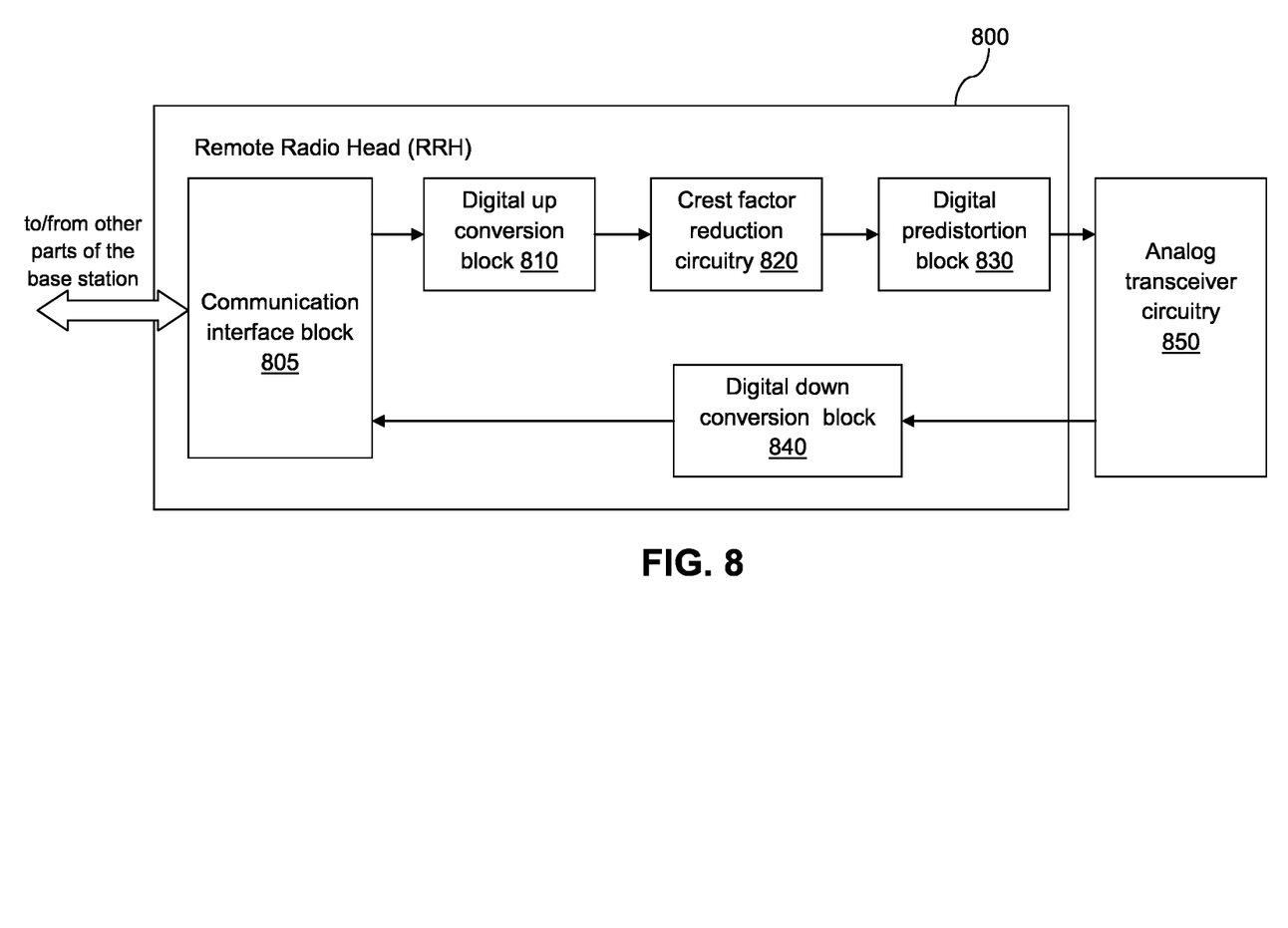
FIG. 8 shows illustrative wireless communication system that includes wireless communications circuitry with CFR circuitry as one embodiment in accordance with the present invention.

FIG. 8, meant to be illustrative and not limiting, shows an illustrative wireless communication system that includes wireless communications circuitry (e.g., remote radio head (RRH) circuitry 800) with CFR circuitry 820 as one embodiment in accordance with the present invention. Apart from CFR circuitry 820, RRH circuitry 800 may also include communication interface (e.g., the Common Public Radio Interface (CPRI) interface, the Open Base Station Architecture Initiative (OBSAI) interface, etc.), block 805, digital up conversion (DUC) block 810, digital predistortion (DPD) block 830, and digital down conversion (DDC) block 840. It should be appreciated that RRH circuitry 800 may be used in base stations for wireless communication systems such as, among others, the Global System for Mobile Communications (GSM), and Long Term Evolution communication standards.

RRH circuitry 800 may be coupled to an external circuitry such as analog transceiver circuitry 850. Signals received from analog transceiver circuitry 850 may be down-converted by DDC block 840 before they are transmitted to communication interface block 805. In one embodiment, RRH circuitry 800 may be implemented on a programmable logic device or an integrated circuit (e.g., integrated circuit 500 of FIG. 5). It should be appreciated that signals from analog transceiver circuitry 850 may have higher frequencies compared to the operating frequency of the programmable logic device. Accordingly, DDC block 840 may be used to down-convert the signals received from analog transceiver circuitry 850.

Communication interface block 805 may receive signals from DDC block 840, and may transmit the signals to other circuitries or modules in the base station (the details of which are not shown in order to not unnecessarily obscure the present invention). Communication interface block 805 may also receive signals from other parts of the base station and the signals may be up-converted by DUC block 810. It should be appreciated that the signals may have a high PAR that may affect circuits (e.g., power amplifiers) within analog transceiver circuitry 850.

Accordingly, CFR circuitry 820 may be included to limit the dynamic range or reduce the PAR of the signals that are transmitted from RRH circuitry 800. In one embodiment, CFR circuitry 820 may be similar to CFR circuitry 100 of FIG. 1. In the embodiment of FIG. 8, CFR circuitry 820 may be placed after the DUC stage (e.g., DUC block 810) and prior to equalization or DPD forward path filtering (e.g., DPD block 830). It should be appreciated that DPD block 830 may be included to linearize the signals from RRH circuitry 800 before they are transmitted to analog transceiver circuitry 850.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The foregoing is merely illustrative of the principles of this invention and various modifications can be made by those skilled in the art without departing from the scope and spirit of the invention.

What is claimed is:

1. A method comprising:
   with peak detection circuitry, identifying a first signal peak having a first signal peak value from an input signal;
   with serial division circuitry, performing a serial division operation based on the first signal peak value to produce a scaling factor; and
   with the peak detection circuitry, identifying a second signal peak having a second signal peak value from the input signal in parallel with the serial division operation.

2. The method defined in claim 1, wherein the serial division operation is a first serial division operation, the method further comprising:
   with the serial division circuitry, performing a second serial division operation based on the second peak value to produce the scaling factor when the second peak value is greater than the first peak value, wherein the second serial division operation replaces the first serial division operation, and wherein replacing the first serial division comprises halting the first serial division operation in the serial division circuitry and configuring the serial division circuitry to perform a second serial division operation.

3. The method defined in claim 2, wherein the first serial division operation is stopped by the performing of the second serial division operation.

4. The method defined in claim 1, wherein the first and second peak values comprise signal magnitudes above a threshold value.

5. The method defined in claim 1 further comprising:
   with the peak detection circuitry, identifying a peak detection window for the input signal; and
   with the peak detection circuitry, determining whether the first signal peak lies within the peak detection window.

6. The method defined in claim 5 further comprising:
   with the peak detection circuitry, determining whether the second signal peak lies within the peak detection window, wherein the first serial division operation is halted when the second signal peak lies within the peak detection window and the second peak value is greater than the first signal peak value.

7. A method of operating an integrated circuit comprising:
   with peak detection circuitry, detecting a first signal peak having a first signal peak value from a signal;
   with a division circuit, performing a first division operation based on the first peak to obtain a first scaling factor based on the first signal peak value;
   with the peak detection circuitry, detecting a second signal peak having a second signal peak value from the signal;
   with the division circuit, determining whether the second signal peak value is greater than the first signal peak value; and
   with the division circuit, halting the first division operation in response to determining that the second signal peak value is greater than the first signal peak value.

8. The method defined in claim 7 wherein the second peak value includes a plurality of bits, wherein the first division operation is performed over a plurality of clock cycles, the method further comprising:
   with the division circuit, performing a second division operation based on the second peak to obtain a second scaling factor based on the second peak value, wherein performing the second division operation comprises performing a division operation based on a single bit of plurality of bits of the second signal peak value at every clock cycle.

9. The method defined in claim 7 further comprising:
   with a pulse generator circuit, generating a plurality of cancellation pulses based on the first scaling factor; and
   with a subtractor circuit, subtracting the plurality of cancellation pulses from the signal.

10. The method defined in claim 9 further comprising:
    with the peak detection circuitry, determining a threshold magnitude based on the type of signal, wherein the signal peak values of the first and second peaks are greater than the threshold magnitude.

11. The method defined in claim 7 further comprising:
    with the peak detection circuitry, identifying a peak detection window for the signal; and
    with the peak detection circuitry, determining whether the second signal peak lies within the peak detection window, wherein the first division operation is halted when the second signal peak lies within the peak detection window.

12. The method defined in claim 7, wherein the first division operation is performed over a plurality of clock cycles, and wherein the first division operation comprises:
    performing a division operation based on one single bit of the first signal peak value at every clock cycle.

13. The method defined in claim 7 wherein the method is performed by a crest factor reduction (CFR) module on an integrated circuit.

14. An integrated circuit comprising:
    a peak detection circuit operable to receive an input data stream and further operable to identify a first signal peak in the input data stream; and
    a serial division circuit operable to perform a first serial division operation based on a peak value of the identified first signal peak to obtain a scaling factor based on the identified first signal peak, wherein the signal peak value comprises a plurality of bits, and wherein the serial division circuit comprises a divider module operable to perform a division operation based on a selected bit of the plurality of bits at every clock cycle.

15. The integrated circuit defined in claim 14, wherein the peak detection circuit is further operable to identify a second signal peak concurrently with the first serial division operation.

16. The integrated circuit defined in claim 15, wherein the serial division circuit is operable to perform a second serial division operation based on the identified second signal peak, wherein the first serial division operation is stopped by the performing of the second serial division operation.

17. The integrated circuit defined in claim 16, wherein a peak value of the identified second signal peak is greater than the peak value of the identified first signal peak value.

18. The integrated circuit of claim 14 further comprising:
  pulse generation circuitry operable to produce a cancellation pulse based on the scaling factor.

19. The integrated circuit defined in claim 18 further comprising:
  a subtractor circuit operable to receive the cancellation pulse and further operable to subtract the cancellation pulse from the input data stream to generate a scaled output.

20. The integrated circuit defined in claim 19 further comprising:
  analog transceiver circuitry, wherein the analog transceiver circuitry is operable to receive signals transmitted from a first subset of components in the integrated circuit and transmit signals to be received by a second subset of components in the integrated circuit.

* * * * *